United States Patent
Kang

(10) Patent No.: US 8,863,768 B2
(45) Date of Patent: Oct. 21, 2014

(54) DEVICE FOR MOUNTING AND REMOVING VALVE PACKING AND METHOD THEREOF

(75) Inventor: Shin Cheul Kang, Daejeon (KR)

(73) Assignee: Korea Hydro & Nuclear Power Co., Ltd, Gyeongsangbuk-Do (KR)

( * ) Notice: Subject to any disclaimer, the term of this patent is extended or adjusted under 35 U.S.C. 154(b) by 34 days.

(21) Appl. No.: 13/813,668

(22) PCT Filed: Sep. 1, 2010

(86) PCT No.: PCT/KR2010/005908
§ 371 (c)(1),
(2), (4) Date: Mar. 8, 2013

(87) PCT Pub. No.: WO2012/020879
PCT Pub. Date: Feb. 16, 2012

(65) Prior Publication Data
US 2013/0153049 A1    Jun. 20, 2013

(30) Foreign Application Priority Data

Aug. 9, 2010   (KR) .................. 10-2010-0076272

(51) Int. Cl.
*F16K 43/00*   (2006.01)
*F16J 15/18*   (2006.01)
*F16K 41/02*   (2006.01)
*B25B 27/00*   (2006.01)

(52) U.S. Cl.
CPC .............. *F16K 43/00* (2013.01); *F16J 15/184* (2013.01); *F16K 41/02* (2013.01); *F16J 15/189* (2013.01); *B25B 27/0028* (2013.01)
USPC ....................... 137/315.28; 251/214; 277/511

(58) Field of Classification Search
USPC .............. 137/315.28; 251/214; 277/308, 375, 277/510, 511, 519, 520, 525, 529, 531, 534
See application file for complete search history.

(56) References Cited

U.S. PATENT DOCUMENTS

| | | | | |
|---|---|---|---|---|
| 4,262,690 A | * | 4/1981 | Binegar | 137/246.13 |
| 4,468,039 A | * | 8/1984 | Le et al. | 277/520 |
| 4,795,171 A | * | 1/1989 | Quevedo Del Rio | 277/512 |
| 5,476,117 A | * | 12/1995 | Pakula | 137/312 |

(Continued)

FOREIGN PATENT DOCUMENTS

KR   2000-0073230 A   12/2000

OTHER PUBLICATIONS

Korean Intellectual Property Office, Search Report in International Patent Application No. PCT/KR2010/005908 (Aug. 30, 2011).

*Primary Examiner* — Eric Keasel
*Assistant Examiner* — Reinaldo Sanchez-Medina
(74) *Attorney, Agent, or Firm* — Leydig, Voit & Mayer, Ltd.

(57) ABSTRACT

A packing mounting and removing device includes a packing mounting and removing rod, a rod support, a rod fixing nut, and a spiral line. The packing mounting and removing device includes a packing flange having a through hole, a gland bushing, a packing, and a lantern ring. A packing exchange method uses the same. By using the device it is not necessary to use any special equipment for removing the packing, and it is possible to mount and remove the packing without disassembling a driving section and a valve disc section. Therefore, it is possible to noticeably reduce time and cost required for the mounting and removing the packing.

5 Claims, 3 Drawing Sheets

(56) References Cited

U.S. PATENT DOCUMENTS

| | | | |
|---|---|---|---|
| 5,476,271 A | * | 12/1995 | Hatting et al. ............... 277/511 |
| 6,116,573 A | | 9/2000 | Cornette et al. |
| 6,325,387 B2 | * | 12/2001 | Shoemaker .................. 277/511 |
| 6,811,140 B1 | | 11/2004 | Maini |
| 2007/0144585 A1 | | 6/2007 | Del Castillo Miro |
| 2010/0090409 A1 | * | 4/2010 | Sridhar et al. ............... 277/308 |

* cited by examiner

DEVICE FOR MOUNTING AND REMOVING VALVE PACKING AND METHOD THEREOF

TECHNICAL FIELD

The present invention relates to a device and method for mounting and removing a valve packing, and more particularly, to a device and method for mounting and removing a valve packing by which a packing can be mounted and removed without disassembling a driving section and a valve disc.

BACKGROUND ART

In general, in a valve configured to perform a disc opening/closing function through vertical movement of a stem, a lower portion of the stem is submerged in a fluid such as a high pressure vapor, water, oil, or the like, an upper portion of the stem is connected to a handle configured to move the stem, or the like, and a packing is provided to prevent leakage of the fluid from the lower portion of the stem through an outer circumferential surface of the stem. The packing, which is a consumable part configured to seal the valve, loses its sealing performance due to repeated vertical movement of the stem. A decrease in sealing performance means that, in particular, radioactive contamination may occur from a nuclear power plant, and accordingly, a device for effectively exchanging a packing having a decreased sealing performance in a state of preventing such contamination is needed.

Detailed description of individual members of the valve according to the related art, which is technology known to those skilled in the art, will be omitted in the specification.

Two methods of removing the packing 430 from the valve of the related art are proposed. A first method of exchanging the packing in a state in which all of a stud bolt, a stud nut, a guide bushing, a beveled washer, a guide ring, a packing flange and a gland bushing are removed, and a second method of exchanging the packing in a state in which the stud bolt and the stud nut are removed and a stem is moved upward to closely attach a disc to a bonnet are provided. Since a fluid in a pipe should not be leaked during exchange of the packing in a nuclear power plant, an oil refining plant, or a chemical plant, the second method is used. In this method, after removing the stud bolt and the stud nut, the stem, the packing flange and the gland bushing are moved upward, and a high pressure of water or air is injected using a special tool for packing removal (a hydro pic) to raise the packing, removing the packing. Selectively, in a valve including a lantern ring and a leakage collecting flow path to collect leakage, the lantern ring can also be removed in the same manner as the packing.

When the packing is removed by the second method, in order to prevent leakage through a special tool mounting flow path, a flow path inlet should be re-welded or a cover should be tightly fastened to prevent the leakage. Due to the leakage risk, in the case of some valves used in the nuclear power plant or the chemical plant, after a valve disc is moved upward to be closely attached to a valve body to prevent leakage without using the special tool for packing removal, the stud bolt and the stud nut are removed, the stem, the packing flange 460 and the gland bushing are moved upward to obtain a working space, and then the packing and the lantern ring are extracted using a packing removal tool (not shown). In this case, since the working space that can be obtained by moving the packing flange and the gland bushing upward is very narrow and limited, the work becomes difficult, and tangling is generated within the packing to cause limitation in removal of the packing such as damage to the packing. In addition, since the packing removal tool formed of a metal material scratches the stem during removal of the packing, slight leakage may be generated through the scratches even when a new packing is mounted.

DISCLOSURE

Technical Problem

In order to solve the foregoing and/or other problems, it is an aspect of the present invention to provide a device and method for removing and mounting a packing more simply without generation of contamination upon wear of the packing.

Technical Solution

The foregoing and/or other aspects of the present invention may be achieved by providing a packing mounting and removing device including a packing mounting and removing rod, a rod support, a rod fixing nut, a thread, a packing flange having an accommodating groove, a gland bushing and a packing, and a method of exchanging a packing with a new one using the same.

Advantageous Effects

According to the device and method of the present invention, since a special device for removing a packing is not needed and the packing can be mounted and removed without disassembling a driving section and a valve disc section, time and cost consumed to mount and remove the packing can be notably reduced.

MODE FOR INVENTION

Reference will now be made in detail to the embodiments of the present invention, examples of which are illustrated in the accompanying drawings.

Figure 1:
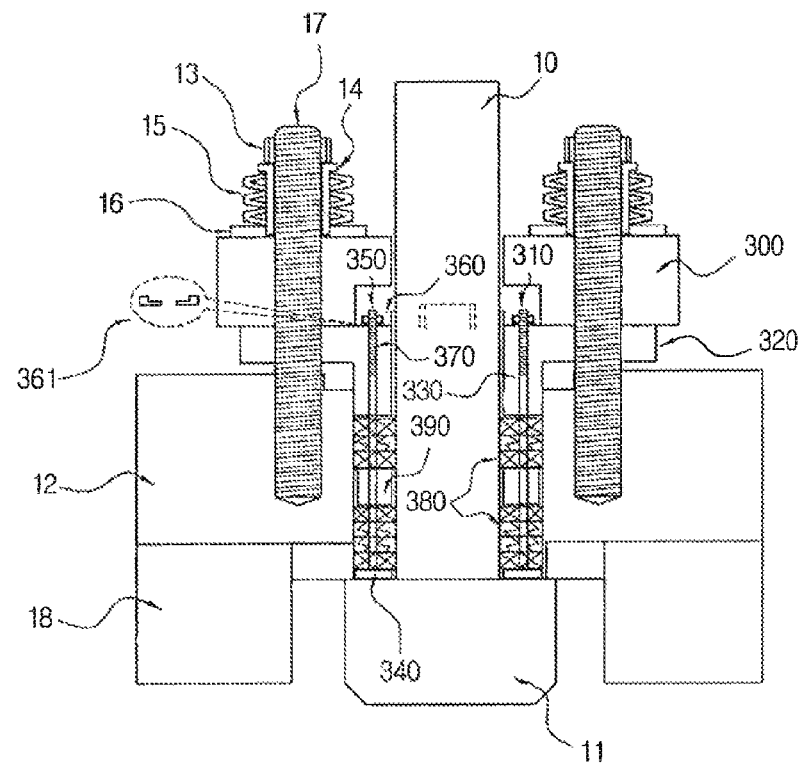
FIG. 1 is a cross-sectional view of a valve at which a packing mounting and removing device according to the present invention is installed.

FIG. 1 is a cross-sectional view showing an exemplary embodiment of a valve at which a packing mounting and removing device according to the present invention is installed. As shown in FIG. 1, the packing mounting and removing device of the present invention includes a packing mounting and removing rod 350 configured to easily mount and remove a packing ring, a rod support 340 configured to support the packing mounting and removing rod and function as a packing follower, a rod fixing nut 360 mounting and removing a packing, a hermetical seal 361 formed of a rubber material and disposed under a nut, a thread 370 disposed on the rod and configured to fasten a fixing nut, a packing flange 300 having an accommodating groove 310 configured to accommodate an upper portion of the packing mounting and removing rod, a gland bushing 320 having a through-hole configured to obtain a space through which the packing mounting and removing rod 350 passes and fix the rod, and a packing 380 and a lantern ring 390 having through-holes configured to enable passage of the packing mounting and removing rod. Selectively, the rod 350 may have a circular or polygonal cross-sectional shape.

Figure 2:
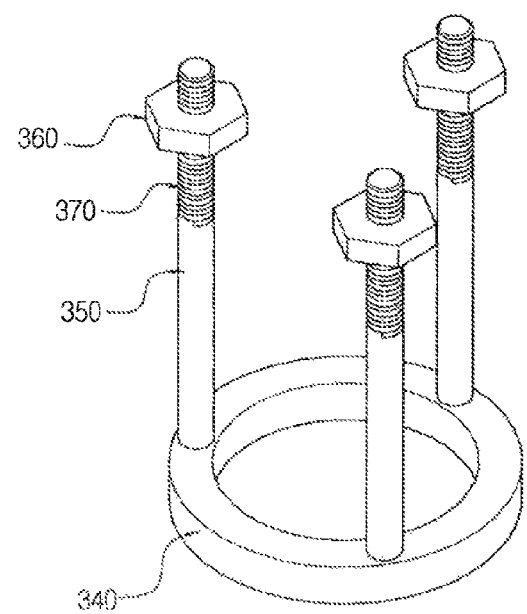
FIG. 2 is a perspective view of the packing mounting and removing device according to the present invention.
Figure 3:
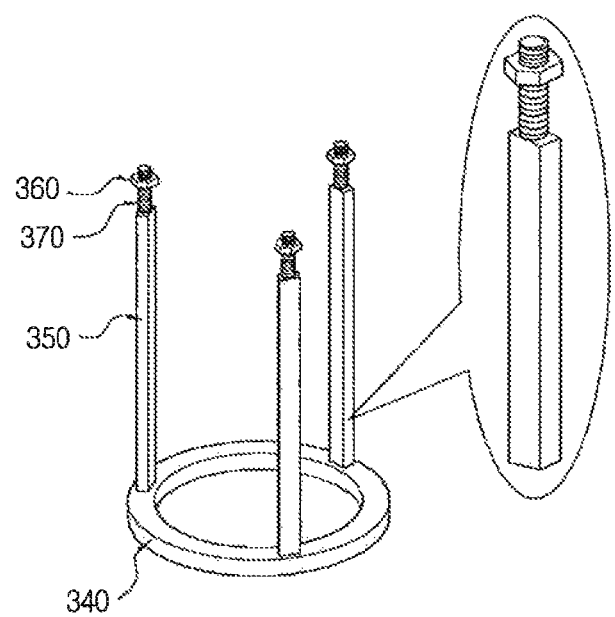
FIG. 3 is a perspective view of the packing mounting and removing device according to the present invention.
Figure 4:
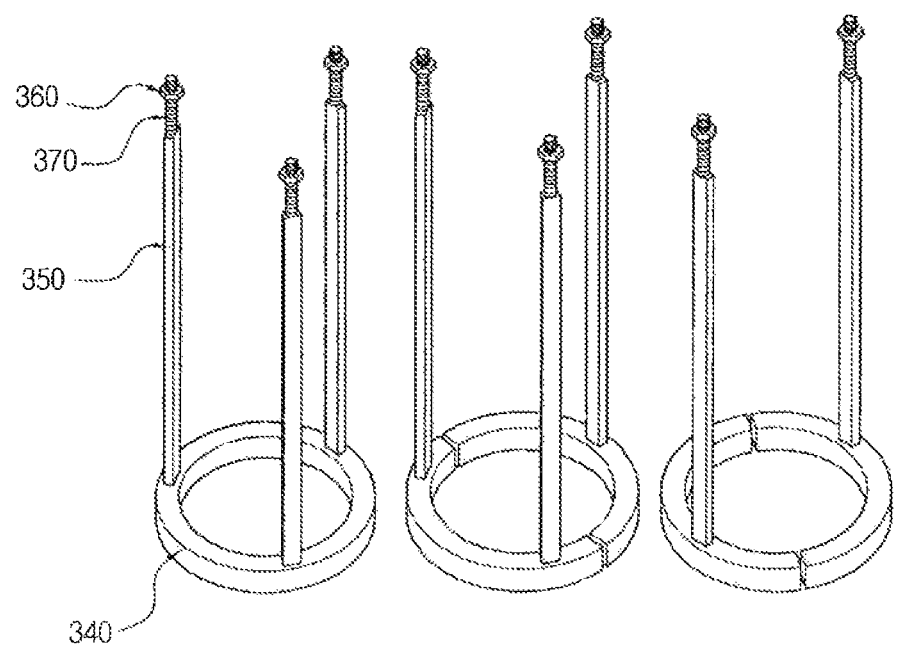
FIG. 4 shows perspective views of various embodiments of the packing mounting and removing device according to the present invention.
Figure 5:
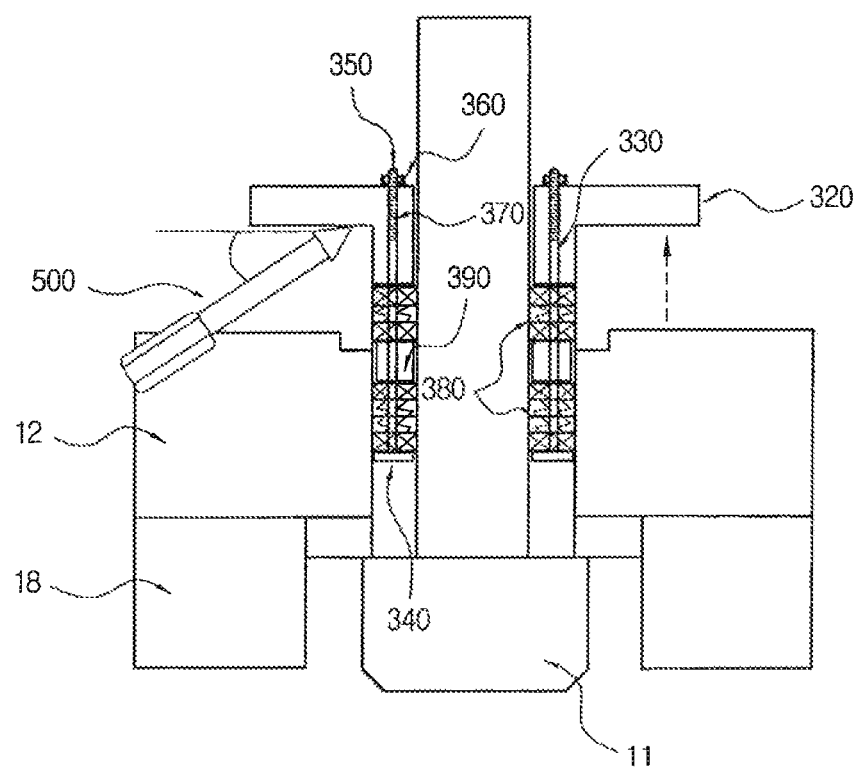
FIG. 5 is a cross-sectional view of the valve at which the packing mounting and removing device according to the present invention is installed.

FIGS. 2, 3 and 4 show a structure of the packing mounting and removing device of the present invention including the packing mounting and removing rod 350, the rod support 340, the rod fixing nut 360, and the thread 370 on the rod, characterized in that two or more packing mounting and removing rods 350 may be provided and the thread 370 capable of fastening the fixing nut 360 to an upper portion of the rod 350 may be provided. Preferably, the packing mounting and removing device may have various shapes such as a circular shape as shown in FIG. 2 or a polygonal shape as shown in FIG. 3, and the rod support 340 and the rod 350 may be an integrated type or a separated type. As shown in FIG. 4, the rod support 340 may have an integrated structure or a structure divided into two or more. Preferably, as the support 340 is divided into two or more, the packing can be freely mounted and removed without removing a driving section connected to an upper end of a stem 10.

As shown in FIGS. 2, 3 and 4, the packing flange 300 includes the accommodating groove 310 formed at a lower end of a flange to accommodate the packing mounting and removing rod 350, and the gland bushing 320 has a structure with a through-hole formed from a lower end to an upper end thereof to accommodate the packing mounting and removing rod 350.

A method of mounting the packing 380 using the packing mounting and removing device shown in FIGS. 2, 3 and 4 without disassembling the driving section includes removing a stud bolt 17, a stud nut 13, a guide bushing 14, a beveled washer 15 and a guide ring 16, moving the packing flange 300 and the gland bushing 320 upward, mounting the packing mounting and removing device including the packing mounting and removing rod 350, the rod support 340, a rod fixing bolt 360 and the thread 370 on the rod, mounting the entire packing 380 from the lowermost packing ring to the uppermost packing ring by passing the packing mounting and removing rod 350 therethrough, mounting the gland bushing 320 by passing the removing rod 350 therethrough, inserting the hermetical seal 361 formed of a rubber material between the packing mounting and removing rod 350 and the rod fixing nut 360, fastening the rod fixing nut 360, positioning the packing flange 300 on the gland bushing 320, and assembling the guide ring 16, the beveled washer 15, the stud nut 13 and the stud bolt 17.

The invention claimed is:

1. A valve for controlling flow of a fluid and a device for mounting packing in the valve and for removing packing from the valve while preventing escape of the fluid flowing through the valve, from the valve, wherein
the valve comprises
a stem having an axis and a disc attached to the stem, wherein the stem is movable along the axis for controlling, via the disc, the flow of the fluid through the valve,
a bonnet through which the stem passes, surrounding and spaced from the stem, and defining a packing volume between the bonnet and the stem for receiving the device for mounting the packing in the valve and for removing the packing from the valve, wherein
the bonnet includes a plurality of internally threaded apertures, and
the packing volume and the disc are located on opposite sides of the bonnet,
a gland bushing surrounding the stem, and including first and second openings passing through the gland bushing, wherein the first openings are alignable with the internally threaded apertures in the bonnet,
a packing flange surrounding the stem and including openings passing through the packing flange and alignable with the internally threaded apertures in the bonnet,
a plurality of externally threaded stud bolts for passing through respective openings in the packing flange and respective first openings in the gland bushing and for engaging the internally threaded apertures in the bonnet, and
a plurality of stud nuts, each stud nut for releasably engaging a respective one of the externally threaded stud bolts and, when the stud nuts are engaged with the externally threaded stud bolts and the externally threaded stud bolts are threadedly engaged with the internally threaded apertures in the bonnet, pressing the packing flange and the gland bushing toward the bonnet and, when the stud nuts are disengaged from the externally threaded stud bolts, permitting removal from the packing volume of the device for mounting the packing in the valve and for removing the packing from the valve;
the device for mounting the packing in the valve and for removing the packing from the valve comprises
a ring-shaped support received within the packing volume,
a plurality of rods connected to and transverse to the ring-shaped support and received at least partially within the packing volume, wherein each of the rods, remote from the ring-shaped support, includes a threaded portion, and
a plurality of fixing nuts, each fixing nut for engaging the threaded portion of a respective one of the rods; and
at least one packing including a plurality of openings passing through the at least one packing and through which the rods respectively pass, wherein
the at least one packing is stacked on the ring-shaped support with the rods passing though the openings in the at least one packing,
each of the rods passes through a respective one of the second openings in the gland bushing, and
the fixing nuts, when engaged with the threaded portions of the respective rods, compress the at least one packing against the ring-shaped support through the gland bushing, and the fixing nuts, when disengaged from the threaded portions of the rods, permit replacement of the at least one packing stacked on the ring-shaped support.

2. The valve for controlling flow of a fluid and the device for mounting the packing in the valve and for removing the packing from the valve according to claim 1, wherein the packing flange includes an internal accommodating groove accommodating the fixing nuts engaging the threaded portions of the rods.

3. The valve for controlling flow of a fluid and the device for mounting the packing in the valve and for removing the packing from the valve according to claim 1, wherein the ring-shaped support is not continuous and includes a plurality of arcuate parts.

4. The valve for controlling flow of a fluid and the device for mounting the packing in the valve and for removing the packing from the valve according to claim 1, wherein each of the rods has a circular cross-section or a polygonal cross-section.

5. A method for replacing a packing in a valve for controlling flow of a fluid, while preventing escape from the valve of the fluid flowing through the valve, using identical first and second devices for mounting the packing, wherein
   the valve comprises
      a stem having an axis and a disc attached to the stem, wherein the stem is movable along the axis for controlling, via the disc, the flow of the fluid through the valve,
      a bonnet though which the stem passes, surrounding and spaced from the stem, and defining a packing volume between the bonnet and the stem for receiving a device for mounting the packing in the valve, wherein the bonnet includes a plurality of internally threaded apertures, and
      the packing volume and the disc are located on opposite sides of the bonnet,
      a first gland bushing for surrounding the stem and including first and second openings passing through the first gland bushing, wherein the first openings are alignable with the internally threaded apertures in the bonnet,
      a packing flange for surrounding the stem and including openings passing through the packing flange and alignable with the internally threaded apertures in the bonnet,
      a plurality of externally threaded stud bolts for passing through respective openings in the packing flange and respective first openings in the first gland bushing and for engaging the internally threaded apertures in the bonnet, and
      a plurality of stud nuts, each stud nut for engaging a respective one of the externally threaded stud bolts; and
   each of the first and second devices for mounting the packing in the valve comprises
      a ring-shaped support that can be received within the packing volume,
      a plurality of rods connected to and transverse to the ring-shaped support and that can be received at least partially within the packing volume, wherein each of the rods, remote from the ring-shaped support, includes a threaded portion. and
      a plurality of fixing nuts, each fixing nut for engaging the threaded portion of a respective one of the rods; and
   the method comprises:
      preparing the second device for mounting the packing in the valve, the first device for mounting the packing the valve having been previously identically prepared and installed in the valve, wherein preparing the second device for mounting the packing comprises
         stacking at least one packing including a plurality of openings passing through the at least one packing on the ring-shaped support of the second device for mounting the packing, with the rods passing through the openings in the at least one packing,
         placing a second gland bushing, identical to the first gland bushing, on the second device for mounting the packing in the valve, with each of the rods passing through a respective one of the second openings in the second gland bushing, and
         engaging the fixing nuts with the threaded portions of the respective rods of the second device for mounting the packing, and compressing the at least one packing against the ring-shaped support through the second gland bushing,
      moving the stem along the axis so that the disc engages the bonnet and blocks flow of the fluid from the valve into the packing volume,
      removing the first device for mounting the packing from the valve, and which has been previously prepared and installed in the valve, wherein removing the first device for mounting the packing comprises
         disengaging and removing the stud bolts from the respective externally threaded studs,
         removing the packing flange from the externally threaded studs, and
         removing the first gland bushing and the first device for mounting the packing from the externally threaded studs and from the packing volume,
      installing the second device for mounting the packing in the valve by
         placing the second device for mounting the packing and the second gland bushing in the packing volume and on the bonnet, with the stud bolts passing through the respective second openings in the second gland bushing,
         placing the packing flange on the second gland bushing with the externally threaded stud bolts passing through the openings in the packing flange, and
         engaging the stud bolts with the respective externally threaded studs and pressing the packing flange and the second gland bushing toward the bonnet, and
      moving the stem along the axis to move the disc away from the bonnet.

* * * * *